United States Patent Office 2,888,234
Patented May 26, 1959

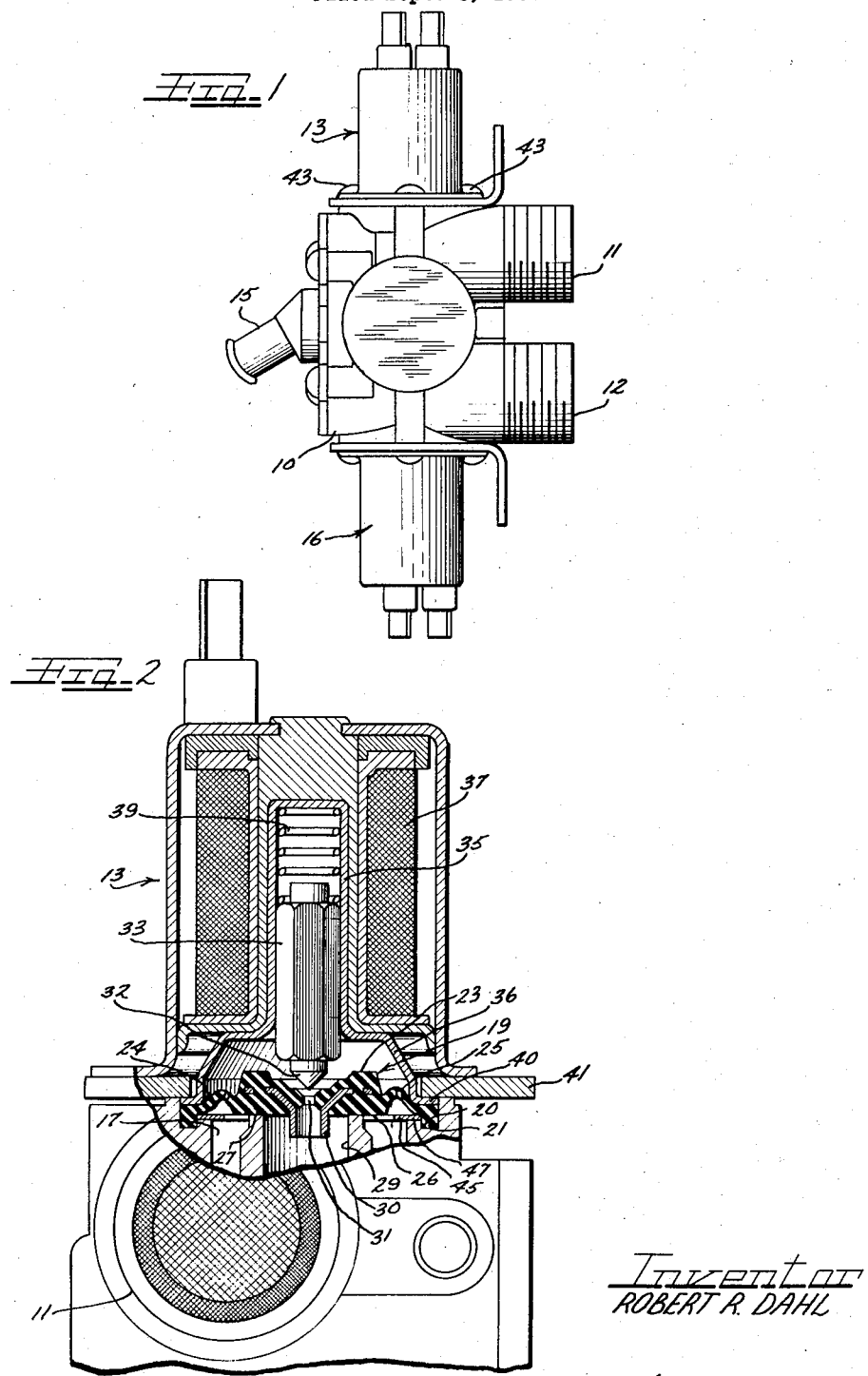

2,888,234
PILOT CONTROLLED DIAPHRAGM VALVE

Robert R. Dahl, Chicago, Ill., assignor to The Dole Valve Company, Chicago, Ill., a corporation of Illinois Application September 5, 1956, Serial No. 608,097

1 Claim. (Cl. 251—30)

This invention relates to improvements in diaphragm valves and more particularly relates to such valves as are pressure operated and pilot controlled.

Heretofore, pressure operated pilot controlled valves having a diaphragm coming into engagement with a seat surrounding a port and body for the valve have been in common use for controlling the flow of water to automatic household appliances, such as washing machines, dish washers and like devices. Such valves, however, under high pressure and flow rate conditions, are subject to delay and failure in closing. This is due to the highly dynamic reactions acting on the diaghragm outside of the center thereof, which are required to change the direction of the high velocity stream of water, causing vibration and frequent cocking of the diaphragm while the pilot is trying to close the diaphragm.

A principal object of my invention is to remedy the foregoing disadvantages in pressure operated pilot controlled diaphragm valves by reducing the turbulence eccentric of the center of the diaphragm valve.

A further object of the invention is to improve upon pressure operated diaphragm valves by baffling the high velocity stream of water flowing to the diaphragm in such a manner as to prevent vibration and cocking of the diaphragm.

A still further object of the invention is to improve upon the closing characteristics of pressure operated pilot controlled diaphragm valves by providing an annular baffle extending over the inlet passageway to the diaphragm to direct the flow of inlet water toward the center of the diaphragm and reduce turbulence in the area of the web of the diaphragm and divert the flow of water to prevent dirt from impinging and lodging in the diaphragm bleed hole.

These and other objects of the invention will appear from time to time as the following specification proceeds and with reference to the accompanying drawing wherein:

Figure 1 is a view in side elevation of a fluid mixing valve in which the flow of water through the outlet of the valve is controlled by pressure operated pilot control diaphragm valves; and Figure 2 is a fragmentary vertical sectional view taken through one of the diaphragm valves and its control solenoid.

In Figure 1 of the drawing, I have shown a mixing valve of the type commonly used in domestic applincances, such as washing machines and the like, having a valve body 10. The valve body 10 has hot and cold water inlets 11 and 12, respectively, leading thereinto for supplying hot and cold water for mixture in a central mixing chamber (not shown) as in an application of James A. Kozel and Victor E. Rimsha, Serial No. 380,952, filed September 18, 1953, and no part of the present invention. The valve, therefore, need only be shown herein in sufficient detail to fully disclose the novel features of the present invention.

A solenoid 13 is provided to control the direct flow of hot water from the inlet 11 through an outlet 15 of the valve. A solenoid 16 is provided to control the flow of mixed hot and cold water through the outlet 15 as in the aforementioned application Serial No. 380,952. The solenoids 13 and 16 and valves controlled thereby are each of a similar construction and operate in a similar manner, so the solenoid 13 and its valve need only herein be shown and described in detail.

The hot water inlet 11 has communication with an annular inlet passageway 17 opening to an end of the valve body 10 within the inner margins of a diaphragm valve 19. The diaphragm valve 19 extends over the annular inlet passageway 17 and has a thickened rib 20 extending about its outer margin and extending within an annular recess 21 in the end face of the valve body 10, and surrounding the inlet 17 and retained in sealing engagement therewith, as will hereinafter more clearly appear as this specification proceeds.

The diaphragm valve 19 is preferably formed from rubber, an elastomer or other like resilient material and has a thickened central portion 23 spaced inwardly of the annular rib 20 and connected therewith by a relatively thin web 24 having a bleeder passageway 25 leading therethrough. The thickened central portion 23 of the diaphragm valve has an inner valve face 26 having engagement with an annular seat 27 extending around an outlet port opening 29 concentric with the annular passageway 17, to block the flow of fluid through said outlet port opening.

The thickened central portion of the diaphragm valve 19 is shown as having a flanged metal insert 30 molded therein for reinforcing the same. The insert 30 may be a stamped insert and has a tubular portion projecting from the face 26 into the port opening 29. An orifice 31 is shown as leading through the thickened central portion 23 of the diaphragm valve 19 concentric with the center of the tubular portion of the insert 30.

The orifice 31 is adapted to be engaged by a conical valve 32 formed integrally with the end of an armature 33 of the solenoid 13.

The armature is slidably guided within an elongated guide 35 extending from and formed integrally with an end cap 36 for the valve. A compression spring 39, seated in said end cap, biases the valve 32 to engage the orifice 31 upon de-energization of an electromagnet 37 of the solenoid 13.

The end cap 35 has an integrally formed lower flange 40 engaging the outer portion of the rib 20, and maintained in engagement therewith by a yoke 41 encircling the end cap 35 and secured to the valve body, as by screws 43.

Upon energization of the electromagnet 37 the valve 32 on the end of the armature 33 will move out of engagement with the central orifice 31 leading through the diaphragm valve. This will relieve pressure on the outer side of the diaphragm. Pressure on the inner or underside of the diaphragm will then move the valve face 26 out of engagement with the seat 27 to open the valve. The diaphragm valve 19 will then reverse the flow from the annular inlet passageway 17 to flow through the outlet port 29 and out the valve body through the outlet 15.

Upon deenergization of electromagnet 37, the spring 39 will engage the valve 32 with the orifice 31. Fluid under pressure flowing through the bleeder passage 25 to the outer side of the diaphragm will then effect the closing of the valve.

Referring now in particular to the means for improving the closing characteristics of the diaphragm valve 19 and preventing vibration and cocking thereof during closing as well as the lodging of dirt in the diaphragm bleed hole 25, an annular baffle 45 extends over the annular inlet 17 for a portion of the width thereof. As herein shown, the annular baffle 45 abuts an annular face 47 inwardly of the rib 20 and is maintained in position by the flange 40 of the end cap 35 pressing the diaphragm valve 19 into engagement with the outer marginal portion of the annular baffle 45.

The annular baffle 45 may be made from a relatively thin gauge metal and extends over the annular inlet passage 17 a distance sufficient to divert the flow of water from the web 24 of the diaphragm valve 19 to the thickened central portion of the valve and to thereby reduce turbulence in the area of the diaphragm web.

The annular baffle 45 diverts the flow of water away from the web and diaphragm bleed hole, and thus prevents water-borne dirt from impinging and lodging in the diaphragm bleed hole, as well as reduces turbulence in the area of the diaphragm web which would otherwise cause vibrating and cocking of the diaphragm while the valve 32 on the armature 33 is trying to close the orifice 31, after the electromagnet 37 has been deenergized.

It may be seen from the foregoing that the baffle 45 by reducing turbulence in the area of the diaphragm web and preventing cocking of the valve, which commonly occurs due to turbulence over the large surface area of the web, assures a straight line movement of the thickened portion 23 of the diaphragm in a valve closing direction and therefore improves the shut-off characteristics of the valve and increases the speed of closing thereof.

It will be understood that various modifications and variations of the present invention may be effected without departing from the spirit and scope of the novel concepts thereof.

I claim as my invention:

In a solenoid controlled pressure operated diaphragm valve, a valve body having an annular inlet passageway opening to an end thereof, an outlet port concentric with said inlet passageway and a seat facing the end of said valve body between said inlet passageway and said outlet port, a diaphragm sealed to said valve body outwardly of the outer margin of said inlet passageway and extending over said inlet passageway and port and having a thickened central portion having a flat inner face engageable with said seat and having a thinner web extending outwardly of said thickened portion over said inlet having a bleeder passageway leading therethrough, a central orifice leading through said central thickened portion, and an armature having a valve on the inner end thereof engageable with said orifice to create a pressure differential on opposite sides of said valve to effect closing of the same under pressure, a magnet coil extending about said armature and energizable to retract said pilot valve from said central orifice to relieve the pressure on the outer side of said diaphragm and effect opening of said valve under pressure, and means reducing turbulence in the area of said web and directing the flow of high velocity water toward the center of said valve, and thereby protecting said diaphragm from the highly dynamic reactions caused by the change in direction of the flow of water from said inlet to said port and preventing vibration and cocking of said diaphragm while said pilot is closing off said central orifice and thereby assuring quick and positive closing of said diaphragm valve, comprising an annular baffle in the form of a thin washer clamped between the marginal portion of said web and said valve body and extending over said annular inlet passageway for a portion of the width thereof.

References Cited in the file of this patent

UNITED STATES PATENTS

| | | |
|---|---|---|
| 2,007,048 | Goodwin | July 2, 1935 |
| 2,388,990 | Nelson | Nov. 13, 1945 |
| 2,433,507 | Delany | Dec. 30, 1947 |
| 2,752,936 | Cantalupo | July 3, 1956 |